(12) United States Patent
Do et al.

(10) Patent No.: US 9,197,477 B2
(45) Date of Patent: Nov. 24, 2015

(54) APPARATUS AND CIRCUIT FOR PROCESSING CARRIER AGGREGATION

(71) Applicant: Samsung Electronics Co., Ltd., Suwon-si, Gyeonggi-do (KR)

(72) Inventors: Joo-Hyun Do, Seoul (KR); In-Hyoung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 14/152,297

(22) Filed: Jan. 10, 2014

(65) Prior Publication Data

US 2014/0286359 A1 Sep. 25, 2014

(30) Foreign Application Priority Data

Mar. 20, 2013 (KR) ........................ 10-2013-0029965

(51) Int. Cl.
*H04L 27/26* (2006.01)
*H04L 5/00* (2006.01)
*H04L 27/00* (2006.01)

(52) U.S. Cl.
CPC ............ *H04L 27/2657* (2013.01); *H04L 5/001* (2013.01); *H04L 2027/0065* (2013.01)

(58) Field of Classification Search
CPC ................ H04L 27/2657; H04L 5/001; H04L 2027/0076; H04L 7/0012
See application file for complete search history.

(56) References Cited

U.S. PATENT DOCUMENTS

| 7,680,236 | B1 | 3/2010 | Melanson et al. | |
|---|---|---|---|---|
| 7,848,397 | B2 | 12/2010 | Small | |
| 2002/0050946 | A1 | 5/2002 | Chang et al. | |
| 2009/0154613 | A1* | 6/2009 | Lai ................................ | 375/344 |
| 2009/0258628 | A1* | 10/2009 | Lindoff et al. ................ | 455/302 |
| 2010/0296389 | A1 | 11/2010 | Khandekar et al. | |
| 2012/0157101 | A1* | 6/2012 | Uemura et al. ............... | 455/436 |
| 2012/0213096 | A1 | 8/2012 | Krishnamurthy et al. | |
| 2012/0213190 | A1 | 8/2012 | Yoon et al. | |
| 2013/0188756 | A1* | 7/2013 | Sundstrom et al. ........... | 375/319 |
| 2013/0202069 | A1* | 8/2013 | Nilsson et al. ................ | 375/343 |
| 2014/0171001 | A1* | 6/2014 | Fernando et al. .......... | 455/226.1 |
| 2014/0191815 | A1* | 7/2014 | Mirzaei et al. ................ | 331/1 A |

* cited by examiner

*Primary Examiner* — Albert T Chou
(74) *Attorney, Agent, or Firm* — Jefferson IP Law, LLP

(57) ABSTRACT

A circuit for processing Carrier Aggregation (CA) is provided. The circuit includes a plurality of Component Carrier (CC) processors, each CC processor configured to estimate a frequency offset for a related CC and to compensate the estimated frequency offset, a reference clock generator configured to generate a reference clock using a reference frequency offset as one of frequency offsets output from the plurality of CC processors, a plurality of reception Phase Lock Loop (PLL) units, each reception PLL unit configured to generate a reception carrier frequency for the related CC corresponding to the reference clock, and a plurality of transmission PLL units, each transmission PLL unit configured to generate a transmission carrier frequency for the related CC corresponding to the reference clock.

30 Claims, 8 Drawing Sheets

APPARATUS AND CIRCUIT FOR PROCESSING CARRIER AGGREGATION

CROSS-REFERENCE TO RELATED APPLICATION(S)

This application claims the benefit under 35 U.S.C. §119(a) of a Korean patent application filed on Mar. 20, 2013 in the Korean Intellectual Property Office and assigned Serial No. 10-2013-0029965, the entire disclosure of which is hereby incorporated by reference.

TECHNICAL FIELD

The present disclosure relates to an apparatus and circuit for processing Carrier Aggregation (CA) in a wireless communication system. More particularly, the present disclosure relates to an apparatus and circuit for processing CA using a Component Carrier (CC) in a wireless communication system.

BACKGROUND

In a Long Term Evolution-Advanced (LTE-A) mobile communication system of the related art, a CA scheme has been used. The CA scheme is a scheme in which a CC is added in order to increase a data rate without impacting use of a legacy User Equipment (UE), which uses a single carrier. The CA scheme has been applied in the Release 10 version in the LTE mobile communication system, and, for example, the maximum number of CCs used in the CA scheme is five.

However, there is not currently a design for a MOdulator/DE-Modulator (MODEM) that considers the CA scheme.

The CA scheme is divided into an intra-band CA scheme, in which CCs are in the same frequency band, and an inter-band CA scheme, in which the CCs are in different frequency bands according to carrier frequency allocation for each CC. The inter-band CA scheme may be specified into a contiguous CA scheme, in which CCs are in contiguous frequency bands, and a non-contiguous CA scheme, in which the CCs are in non-contiguous frequency bands according to frequency separation among CCs.

Based on frequency usage fairness, network providers are allocated a CC by 5~10 MHz in the same frequency band. Therefore, the CA scheme is generally implemented with a non-contiguous CA scheme or an inter-band CA scheme rather than an intra-band contiguous CA scheme.

In multi-carrier schemes of the related art, a receiver performs a frequency down conversion operation and a filtering operation based on a center frequency of more than two contiguous bandwidths which have a relatively narrow system bandwidth and performs a filtering operation per frequency bandwidth in an analog domain or a digital domain in order to receive more than two contiguous bandwidths which have the relatively narrow system bandwidth. For example, in the LTE mobile communication system, it should be assumed that a signal of each of contiguous bandwidths is received in the same Node B at the same timing.

However, a CA scheme which is currently considered in the LTE mobile communication system is operated based on signals which are transmitted at different timing points from two Node Bs which are at different locations and have different frequency offsets.

In CA schemes of the related art, multiple channels with contiguous CCs are processed such that it is impossible to properly compensate a frequency offset if a timing point of a signal is changed or a frequency offset is changed. This causes a decrease of transmission/reception performance. Thus, the CA schemes of the related art may not be used if a signal is transmitted/received through an inter-band or an intra-band non-contiguous bandwidth.

Accordingly, a need exists for an improved apparatus and method for processing CA.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and circuit for processing Carrier Aggregation (CA).

Another aspect of the present disclosure is to provide an apparatus and circuit for processing CA using a reference Component Carrier (CC).

Another aspect of the present disclosure is to provide apparatus and circuit for processing CA using one reference clock.

Another aspect of the present disclosure is to provide an apparatus and circuit for processing CA by considering a deployment scenario for various CCs.

In accordance with an aspect of the present disclosure, a circuit for processing CA is provided. The circuit includes a plurality of CC processors, each CC processor configured to estimate a frequency offset for a related CC and to compensate the estimated frequency offset, a reference clock generator configured to generate a reference clock using a reference frequency offset as one of frequency offsets output from the plurality of CC processors, a plurality of reception Phase Lock Loop (PLL) units, each reception PLL unit configured to generate a reception carrier frequency for the related CC corresponding to the reference clock, and a plurality of transmission PLL units, each transmission PLL unit configured to generate a transmission carrier frequency for the related CC corresponding to the reference clock.

In accordance with another aspect of the present disclosure, an apparatus for processing CA is provided. The apparatus includes a plurality of CC processors, each CC processor configured to estimate a frequency offset for a related CC and to compensate the estimated frequency offset, a reference clock generator configured to generate a reference clock using a reference frequency offset as one of frequency offsets output from the plurality of CC processors, a plurality of reception PLL units, each reception PLL unit configured to generate a reception carrier frequency for the related CC corresponding to the reference clock, and a plurality of transmission PLL units, each transmission PLL unit configured to generate a transmission carrier frequency for the related CC corresponding to the reference clock.

In accordance with another aspect of the present disclosure, a circuit for processing CA is provided. The circuit includes a plurality of CC processors, each CC processor configured to estimate a frequency offset for a related CC, a reference clock generator configured to generate a reference clock using a reference frequency offset as one of frequency offsets output from the plurality of CC processors, a plurality of reception PLL units, each reception PLL unit configured to generate a reception carrier frequency for the related CC corresponding to the reference clock and to compensate the estimated frequency offset, and a plurality of transmission PLL units, each transmission PLL unit configured to generate a transmission carrier frequency for the related CC corresponding to the reference clock and to compensate the estimated frequency offset.

In accordance with another aspect of the present disclosure, an apparatus for processing CA is provided. The apparatus includes a plurality of CC processors, each CC processor configured to estimate a frequency offset for a related CC, a reference clock generator configured to generate a reference clock using a reference frequency offset as one of frequency offsets output from the plurality of CC processors, a plurality of reception PLL units, each reception PLL unit configured to generate a reception carrier frequency for the related CC corresponding to the reference clock and to compensate the estimated frequency offset, and a plurality of transmission PLL units, each transmission PLL unit configured to generate a transmission carrier frequency for the related CC corresponding to the reference clock and to compensate the estimated frequency offset.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
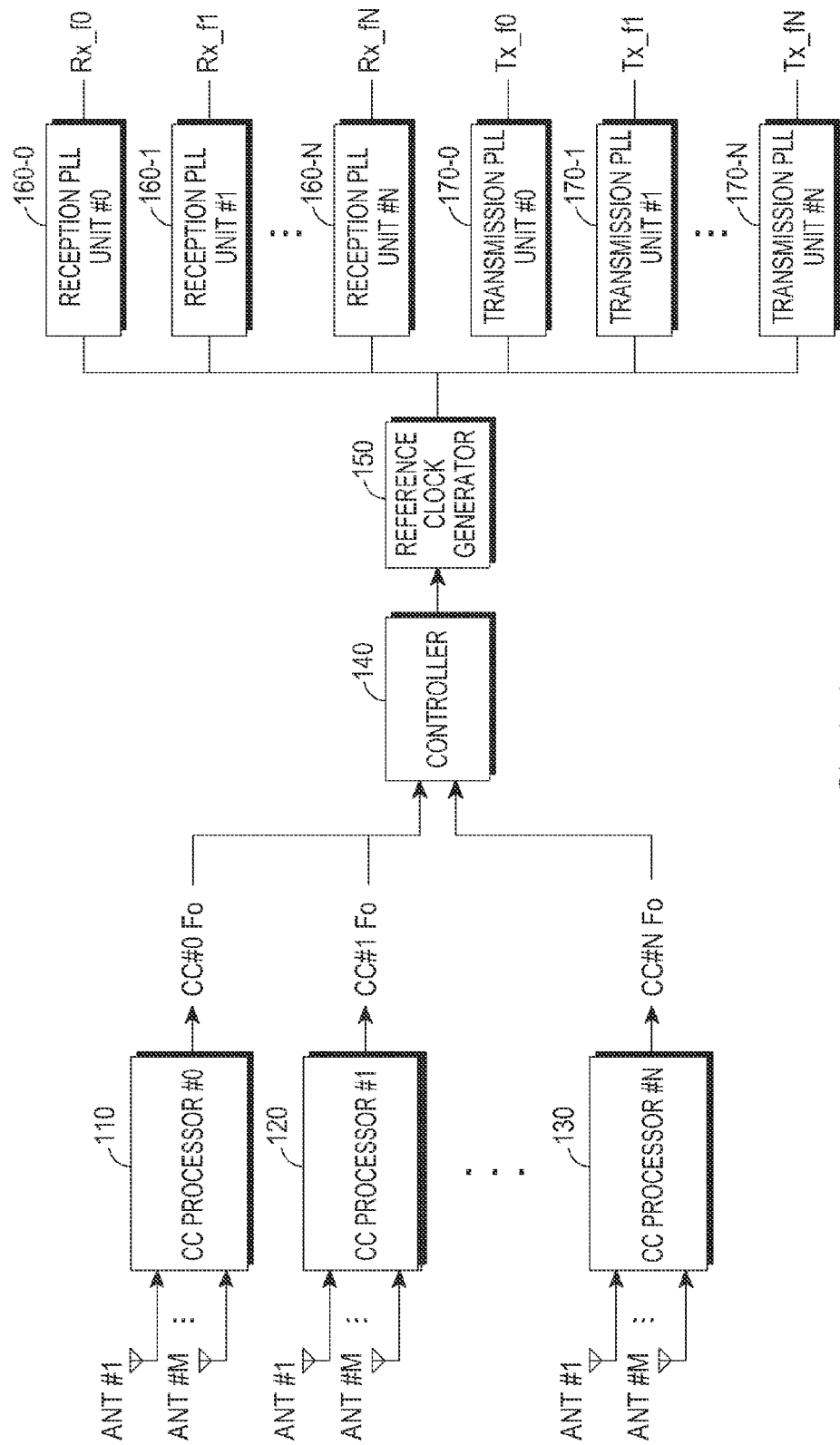
FIG. 1A schematically illustrates an internal structure of a Carrier Aggregation (CA) processing apparatus in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first", "second", and so forth will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of the embodiments. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

An embodiment of the present disclosure proposes an apparatus and circuit for processing Carrier Aggregation (CA).

An embodiment of the present disclosure proposes an apparatus and circuit for processing CA using a reference Component Carrier (CC).

An embodiment of the present disclosure proposes an apparatus and circuit for processing CA using one reference clock.

An embodiment of the present disclosure proposes an apparatus and circuit for processing CA by considering a deployment scenario for various CCs.

An apparatus and method proposed in an embodiment of the present disclosure may be applied to various mobile communication systems such as a Long Term Evolution (LTE) mobile communication system, a Long Term Evolution-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Project Partnership 2 (3GPP2), a Wideband Code Division Multiple Access (WCDMA) mobile communication system proposed in a 3GPP2, a Code Division Multiple Access (CDMA) mobile communication system proposed in a 3GPP2, an Institute of Electrical and Electronics Engineers (IEEE) mobile communication system, an Evolved Packet System (EPS), and the like.

Figure 1B:
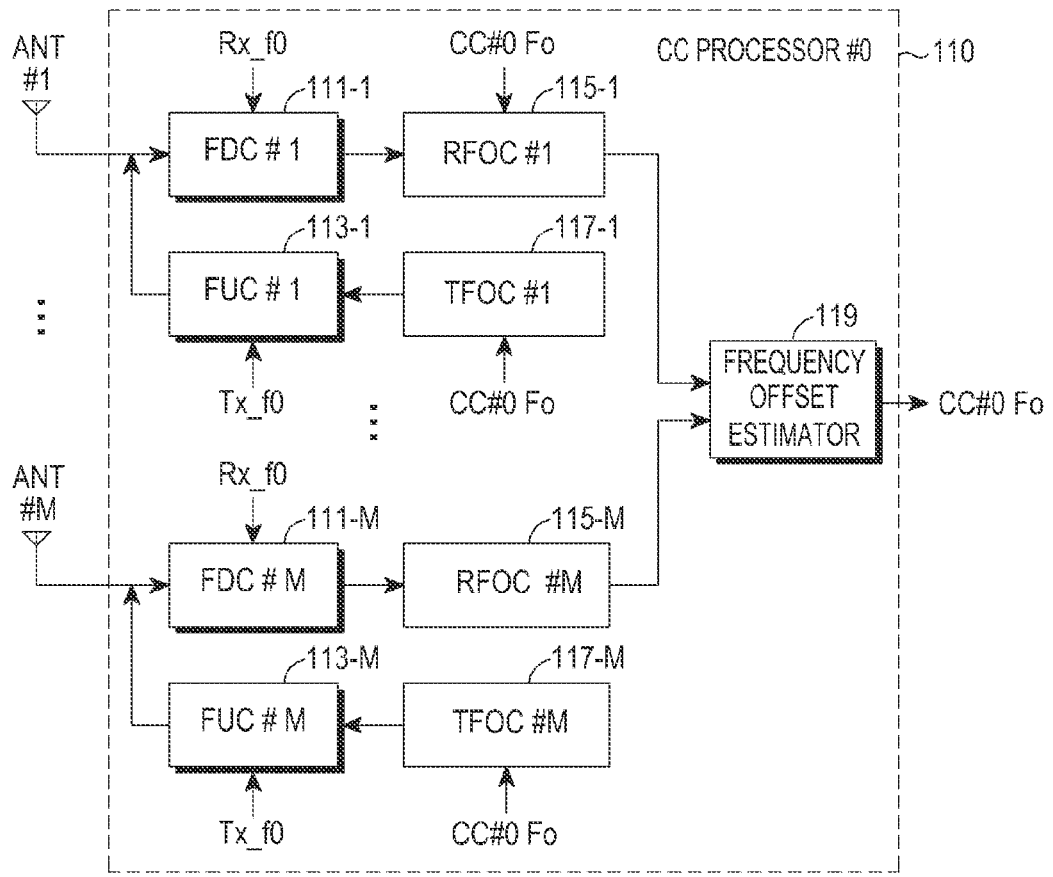
FIG. 1B schematically illustrates an internal structure of a Component Carrier (CC) processor, such as the CC processor #0 110 in FIG. 1A, according to an embodiment of the present disclosure.
Figure 1C:
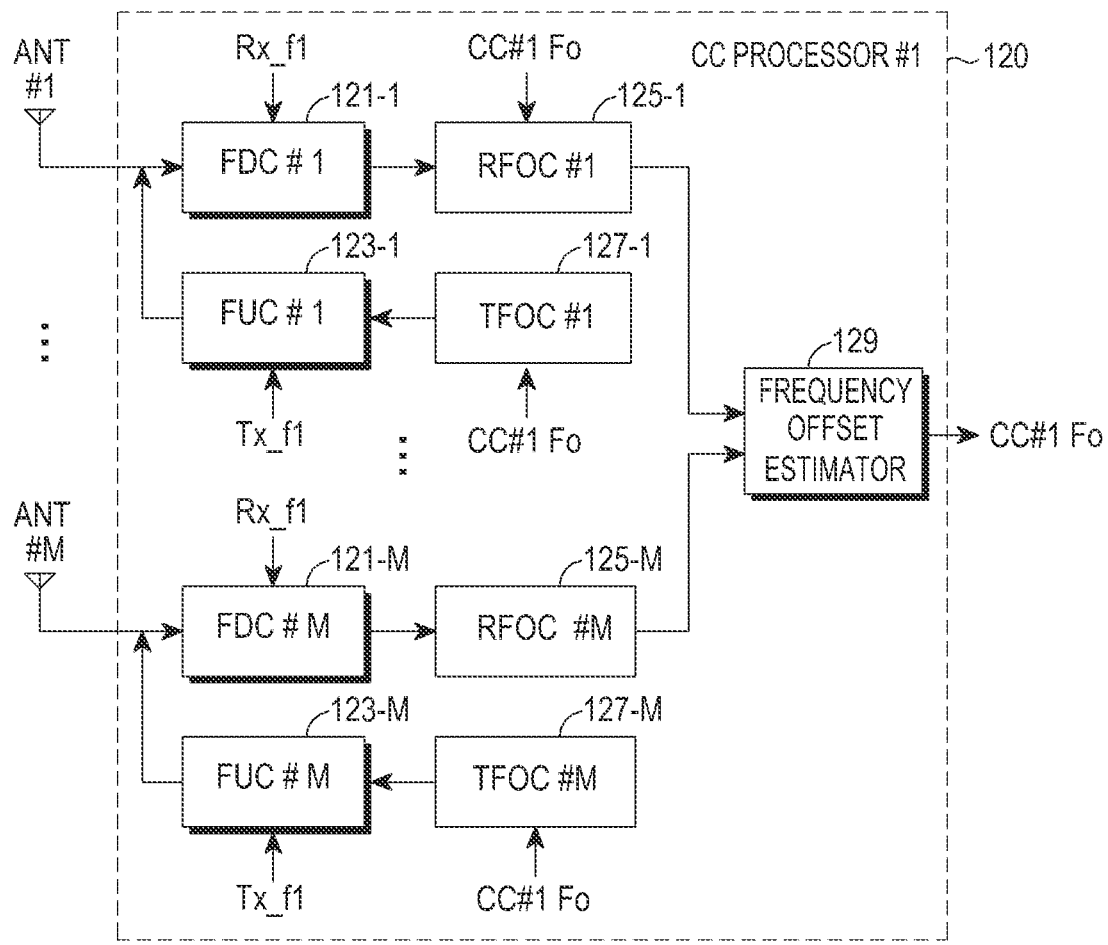
FIG. 1C schematically illustrates an internal structure of a CC processor, such as the CC processor #1 120 in FIG. 1A, according to an embodiment of the present disclosure.
Figure 1D:
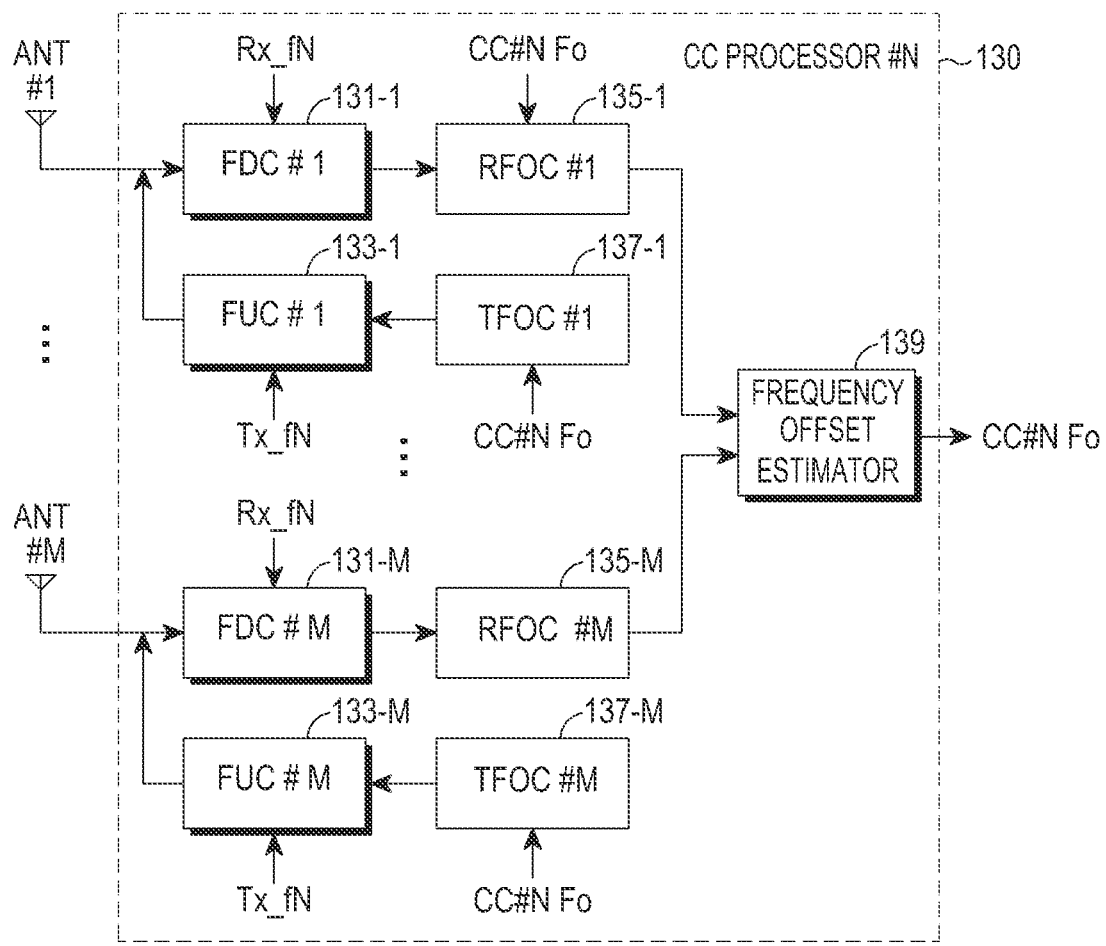
FIG. 1D schematically illustrates an internal structure of a CC processor, such as the CC processor #N 130 in FIG. 1A, according to an embodiment of the present disclosure.

FIG. 1A schematically illustrates an internal structure of a CA processing apparatus in a wireless communication system according to an embodiment of the present disclosure;

FIG. 1B schematically illustrates an internal structure of a CC processor, such as the CC processor #0 110 in FIG. 1A, according to an embodiment of the present disclosure;

FIG. 1C schematically illustrates an internal structure of a CC processor, such as the CC processor #1 120 in FIG. 1A, according to an embodiment of the present disclosure; and FIG. 1D schematically illustrates an internal structure of a CC processor, such as the CC processor #N 130 in FIG. 1A, according to an embodiment of the present disclosure.

Prior to a description of FIGS. 1A to 1D, it will be noted that an internal structure of a CA processing apparatus in FIGS. 1A to 1D is an internal structure of a CA processing apparatus based on a frequency compensator.

Referring to FIG. 1A, the CA processing apparatus includes a plurality of reception antennas, e.g., M reception antennas, i.e., a reception antenna ANT #1 to a reception antenna ANT #M, a plurality of CC processors, e.g., N+1 CC processors, i.e., a CC processor #0 110, a CC processor #1 120, ..., a CC processor #N 130, a controller 140, a reference clock generator 150, a plurality of reception Phase Lock Loop (PLL) units, e.g., N+1 reception PLL units, i.e., a reception PLL unit #0 160-0, a reception PLL unit #1 160-1, ..., a reception PLL unit #N 160-N, and a plurality of transmission PLL units, e.g., N+1 transmission PLL units, i.e., a transmission PLL unit #0 170-0, a transmission PLL unit #1 170-1, ..., a transmission PLL unit #N 170-N.

Referring to FIG. 1B, the CC processor #0 110 includes M Frequency Down-Converters (FDCs), i.e., an FDC #1 111-1, ..., an FDC #M 111-M which are coupled to M reception antennas, i.e., a reception antenna ANT#1 to a reception antenna ANT#M, respectively, M Frequency Up-Converters (FUCs), i.e., an FUC #1 113-1, ..., an FUC #M 113-M which are coupled to the reception antenna ANT#1 to the reception antenna ANT#M, respectively, M Reception Frequency Offset Compensators (RFOCs), i.e., an RFOC #1 115-1, ..., an RFOC #M 115-M which are coupled to the M FDCs, respectively, M Transmission Frequency Offset Compensators (TFOCs), i.e., a TFOC #1 117-1, ..., a TFOC #M 117-M which are coupled to the M FUCs, respectively, and a frequency offset estimator 119.

Referring to FIG. 1C, the CC processor #1 120 includes M FDCs, i.e., an FDC #1 121-1, ..., an FDC #M 121-M which are coupled to the reception antenna ANT#1 to the reception antenna ANT#M, respectively, M FUCs, i.e., an FUC #1 123-1, ..., an FUC #M 123-M which are coupled to the reception antenna ANT#1 to the reception antenna ANT#M, respectively, M RFOCs, i.e., an RFOC #1 125-1, ..., an RFOC #M 125-M which are coupled to the M FDCs, respectively, M TFOCs, i.e., a TFOC #1 127-1, ..., a TFOC #M 127-M which are coupled to the M FUCs, respectively, and a frequency offset estimator 129.

Referring to FIG. 1D, the CC processor #N 130, as the last CC processor, includes M FDCs, i.e., an FDC #1 131-1, ..., an FDC #M 131-M which are coupled to the reception antenna ANT#1 to the reception antenna ANT#M, respectively, M FUCs, i.e., an FUC #1 133-1, ..., an FUC #M 133-M which are coupled to the reception antenna ANT#1 to the reception antenna ANT#M, respectively, M RFOCs, i.e., an RFOC #1 135-1, ..., an RFOC #M 135-M which are coupled to the M FDCs, respectively, M TFOCs, i.e., a TFOC #1 137-1, ..., a TFOC #M 137-M which are coupled to the M FUCs, respectively, and a frequency offset estimator 139.

As illustrated in FIGS. 1A to 1D, the CA processing apparatus includes only one reference clock generator, i.e., the reference clock generator 150, and the reference clock generator 150 generates a reference clock. For example, the reference clock generator 150 may be implemented as a Temperature Compensated Crystal Oscillator (TCXO) or a Digitally Compensated Crystal Oscillator (DCXO). In FIGS. 1A to 1D, while the reference clock generator 150 is implemented as a TCXO or a DCXO, the reference clock generator 150 may be implemented with various forms.

Each of the reception PLL units, i.e., the reception PLL unit #0 160-0, the reception PLL unit #1 160-1, ..., the reception PLL unit #N 160-N, is connected to the reference clock generator 150, and generates a Reception Carrier Frequency (RCF) for each CC using the reference clock which is generated in the reference clock generator 150. The reception PLL unit #0 160-0 generates an RCF for a CC #0, and the reception PLL unit #1 160-1 generates an RCF for a CC #1. In this way, the reception PLL unit #N 160-N, as the last reception PLL unit, generates an RCF for a CC #N.

Each of the transmission PLL units, i.e., the transmission PLL unit #0 170-0, the transmission PLL unit #1 170-1, ..., the transmission PLL unit #N 170-N, is connected to the reference clock generator 150, and generates a Transmission Carrier Frequency (TCF) for each CC using the reference clock which is generated in the reference clock generator 150. The transmission PLL unit #0 170-0 generates a TCF for the CC #0, and the transmission PLL unit #1 170-1 generates a TCF for the CC #1. In this way, the transmission PLL unit #N 170-N, as the last transmission PLL unit, generates a TCF for the CC #N.

The CA processing apparatus includes one reference clock generator 150, and includes PLL units which may generate a TCF and an RCF for each CC based on the one reference clock generator 150 for each transmission path and each reception path.

If it is assumed that a Reference Reception Carrier Frequency Signal (RRCFS) for a CC#n (n=0, 1, 2, ..., N) is "Rx_fn" and a Reference Transmission Carrier Frequency Signal for the CC#n is "Tx_fn", the Rx_fn is provided to an FDC for receiving a carrier frequency signal for each CC#n and the Tx_fn is provided to an FUC for transmitting the carrier frequency signal.

For example, an RRCFS for the CC #0 is "Rx_f0", an RTCFS for the CC #0 is "Tx_f0", the Rx_f0 is provided to the FDC #1 111-1 to the FDC #M 111-M for receiving a carrier frequency signal of the CC #0, and the Tx_f0 is provided to the FUC #1 113-1 to the FUC #M 113-M for transmitting the carrier frequency signal of the CC #0. Further, an RRCFS for the CC #1 is "Rx_f1", an RTCFS for the CC #1 is "Tx_f1", the Rx_f1 is provided to the FDC #1 121-1 to the FDC #M 121-M for receiving a carrier frequency signal of the CC #1, and the Tx_f1 is provided to the FUC #1 123-1 to the FUC #M 123-M for transmitting the carrier frequency signal of the CC #1. In this way, an RRCFS for the CC #N, as the last CC, is "Rx_fN", an RTCFS for the CC #N is "Tx_fN", the Rx_fN is provided to the FDC #1 131-1 to the FDC #M 131-M for receiving a carrier frequency signal of the CC #N, and the Tx_fN is provided to the FUC #1 133-1 to the FUC #M 133-M for transmitting the carrier frequency signal of the CC #N.

A frequency offset estimator included in each CC processor is connected to M RFOCs included in a related CC processor, and estimates a frequency offset CC#n_Fo as a difference between an RRCFS which is provided to each CC processor through the N+1 reception PLL units included in the CA processing apparatus, i.e., the reception PLL unit #0 160-0, the reception PLL unit #1 160-1, . . . , the reception PLL unit #N 160-N and a received carrier frequency signal.

The frequency offset estimator 119 included in the CC processor #0 110 is connected to the RFOC #1 115-1, . . . , the RFOC #M 115-M, and estimates a CC#0_Fo as a frequency offset which is a difference between an RRCFS Rx_f0 which is provided through the reception PLL unit #0 160-0, the reception PLL unit #1 160-1, . . . , the reception PLL unit #N 160-N, and the received carrier frequency signal.

The frequency offset estimator 129 included in the CC processor #1 120 is connected to the RFOC #1 125-1, . . . , the RFOC #M 125-M, and estimates a CC#1_Fo as a frequency offset which is a difference between an RRCFS Rx_f1 which is provided through the reception PLL unit #0 160-0, the reception PLL unit #1 160-1, . . . , the reception PLL unit #N 160-N, and the received carrier frequency signal.

In this way, the frequency offset estimator 129, as the last frequency offset estimator included in the CC processor #N 130, is connected to the RFOC #1 135-1, . . . , the RFOC #M 135-M, and estimates a CC#N_Fo as a frequency offset which is a difference between an RRCFS Rx_fN which is provided through the reception PLL unit #0 160-0, the reception PLL unit #1 160-1, . . . , the reception PLL unit #N 160-N, and the received carrier frequency signal.

Each CC processor compensates a transmission frequency offset and a reception frequency offset, a description of which will be provided below.

Firstly, an operation of compensating the reception frequency offset in each CC processor will be described.

An RFOC included in each CC processor compensates a reception frequency offset using the frequency offset CC#n_Fo output from a frequency offset estimator included in a related CC processor.

For example, in the CC processor #0 110, the RFOC #1 115-1 is connected to the FDC #1 111-1, and estimates the reception frequency offset using the CC#0_Fo as the frequency offset output from the frequency offset estimator 119. In this way, the RFOC #M 115-M, as the last RFOC, is connected to the FDC #M 111-M, and estimates the reception frequency offset using the CC#0_Fo.

In the CC processor #1 120, the RFOC #1 125-1 is connected to the FDC #1 121-1, and estimates the reception frequency offset using the CC#1_Fo as the frequency offset output from the frequency offset estimator 129. In this way, the RFOC #M 125-M, as the last RFOC, is connected to the FDC #M 121-M, and estimates the reception frequency offset using the CC#1_Fo.

In the CC processor #N 130, as the last CC processor, the RFOC #1 135-1 is connected to the FDC #1 131-1, and estimates the reception frequency offset using the CC#N_Fo as the frequency offset output from the frequency offset estimator 139. In this way, the RFOC #M 135-M, as the last RFOC, is connected to the FDC #M 131-M, and estimates the reception frequency offset using the CC#N_Fo.

Secondly, an operation of compensating the transmission frequency offset in each CC processor will be described.

A TFOC included in each CC processor compensates a transmission frequency offset using the frequency offset CC#n_Fo output from the frequency offset estimator included in a related CC processor.

For example, in the CC processor #0 110, the TFOC #1 117-1 is connected to the FUC #1 113-1, and estimates the transmission frequency offset using the CC#0_Fo as the frequency offset output from the frequency offset estimator 119. In this way, the TFOC #M 117-M, as the last TFOC, is connected to the FUC #M 113-M, and estimates the transmission frequency offset using the CC#0_Fo.

In the CC processor #1 120, the TFOC #1 127-1 is connected to the FUC #1 123-1, and estimates the transmission frequency offset using the CC#1_Fo as the frequency offset output from the frequency offset estimator 129. In this way, the TFOC #M 127-M, as the last TFOC, is connected to the FUC #M 123-M, and estimates the transmission frequency offset using the CC#1_Fo.

In the CC processor #N 130, as the last CC processor, the TFOC #1 137-1 is connected to the FUC #1 133-1, and estimates the transmission frequency offset using the CC#N_Fo as the frequency offset output from the frequency offset estimator 139. In this way, the TFOC #M 137-M, as the last TFOC, is connected to the FUC #M 133-M, and estimates the transmission frequency offset using the CC#N_Fo.

For example, each of the TFOCs and the RFOCs in each CC processor may be implemented as a phase rotator such as a COordinate Rotation DIgital Computer (CORDIC), or a Read Only Table (ROM) table, or a module which may convert a frequency of a signal such as a complex multiplier based-phase converter. In an embodiment of the present disclosure, the TFOCs and the RFOCs are implemented as phase rotators, ROM tables, or phase converters. However, it will be understood by those of ordinary skill in the art that the TFOCs and the RFOCs may be implemented with various forms.

An operation of a CA processing apparatus according to an embodiment of the present disclosure will be described with reference to FIGS. 1A to 1D.

A reference clock for the CA processing apparatus compensates a frequency offset based on a frequency offset which is estimated in a frequency offset estimator included in a related CC processor corresponding to a CC which is selected from among N+1 CCs, i.e., the CC#0 to the CC#N, i.e., a reference frequency offset. In this case, a frequency offset compensator included in a transmission path and a reception path is not operated for the selected CC.

The CA processing apparatus may perform a reference clock control operation based on a CC which has the best channel quality among the N+1 CCs, i.e., the CC#0 to the CC#N. Here, the channel quality may be determined using various metrics such as a Carrier-to-Interference and Noise Ratio (CINR), Reference Signal Received Power (RSRP), a Reference Signal Received Quality (RSRQ), a Reference Signal Strength Indicator (RSSI), a Channel Quality Indicator (CQI), and a BLock Error Rate (BLER) for a control channel or a data channel for each CC. In FIGS. 1A to 1D, the various metrics such as the CINR, the RSRP, the RSRQ, the RSSI, the CQI, and the BLER are used for selecting a CC used for the reference clock control operation. However, it will be understood by those of ordinary skill in the art that metrics used for selecting the CC used for the reference clock control operation are not limited.

The CA processing apparatus may perform a reference clock control operation based on a CC having the best channel quality among N+1 CCs, i.e., the CC#0 to the CC#N. For example, a period of selecting a CC used for the reference clock control operation may be a measurement period by which various metrics such as the CINR, the RSRP, the RSRQ, the RSSI, the CQI, and the BLER are measured. If the various metrics such as the CINR, the RSRP, the RSRQ, the RSSI, the CQI, and the BLER are filtered, the period of selecting the CC used for the reference clock control operation may be set to a multiple of the measurement period.

A frequency offset which is estimated in a frequency offset estimator included in CC processors corresponding to remaining CCs which are not used for controlling the reference clock is used for compensating a frequency offset through TFOCs and RFOCs included in a related CC processor.

Figure 2A:
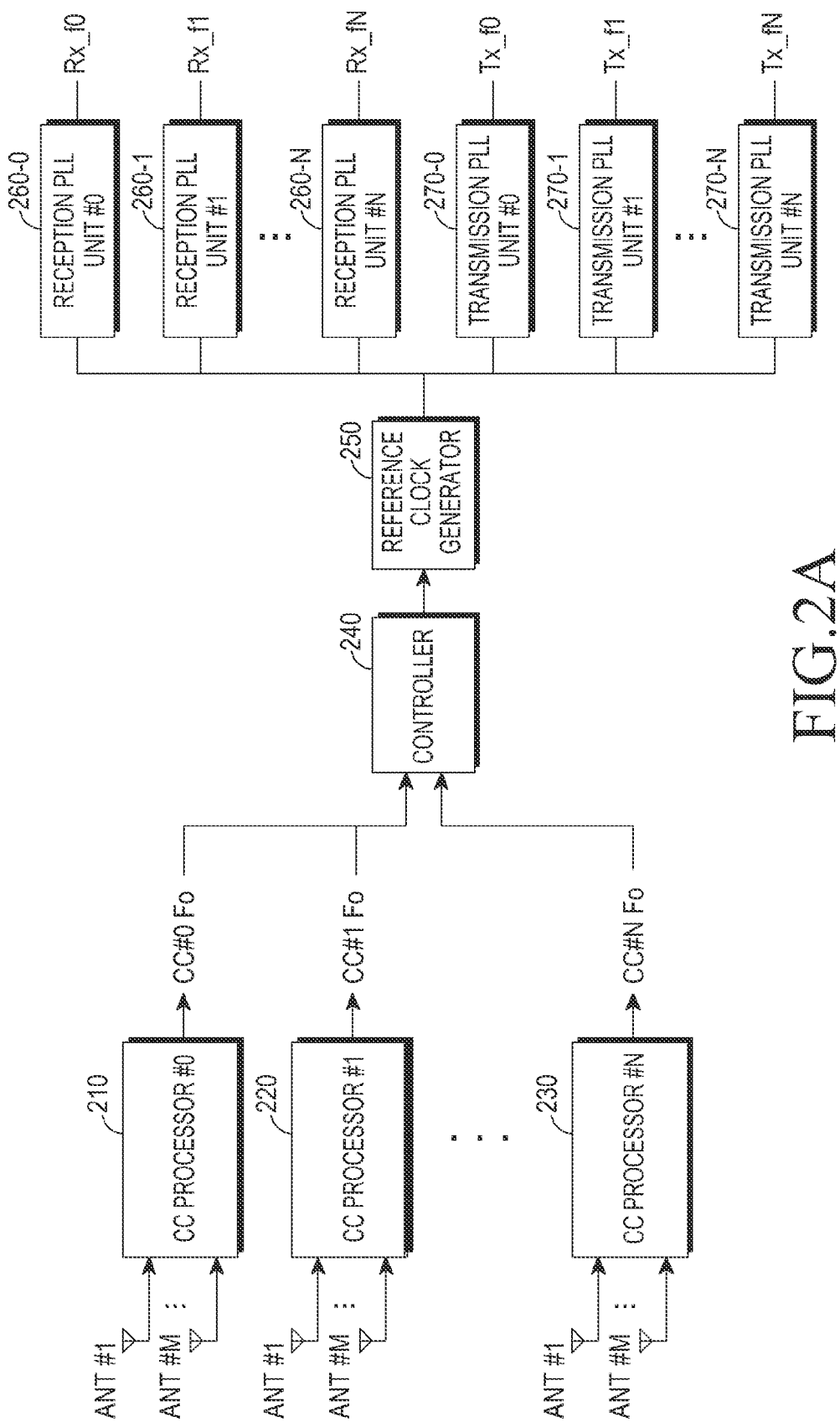
FIG. 2A schematically illustrates an internal structure of a CA processing apparatus in a wireless communication system according to an embodiment of the present disclosure.
Figure 2B:
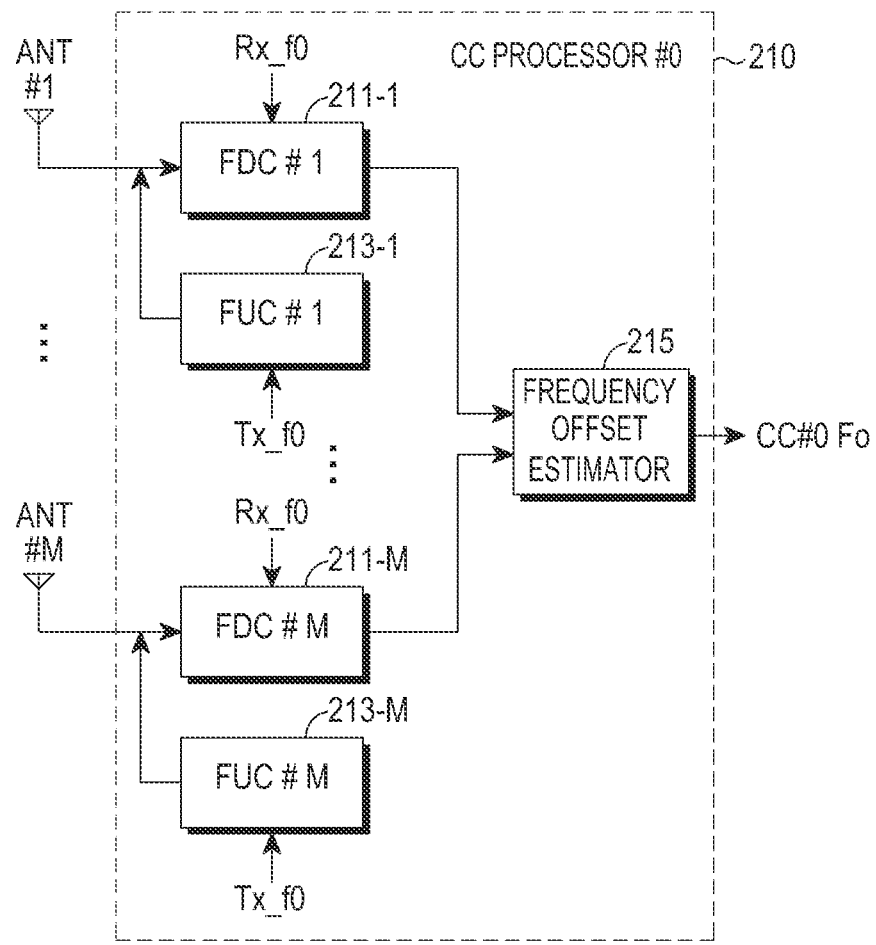
FIG. 2B schematically illustrates an internal structure of a CC processor, such as the CC processor #0 210 in FIG. 2A, according to an embodiment of the present disclosure.
Figure 2C:
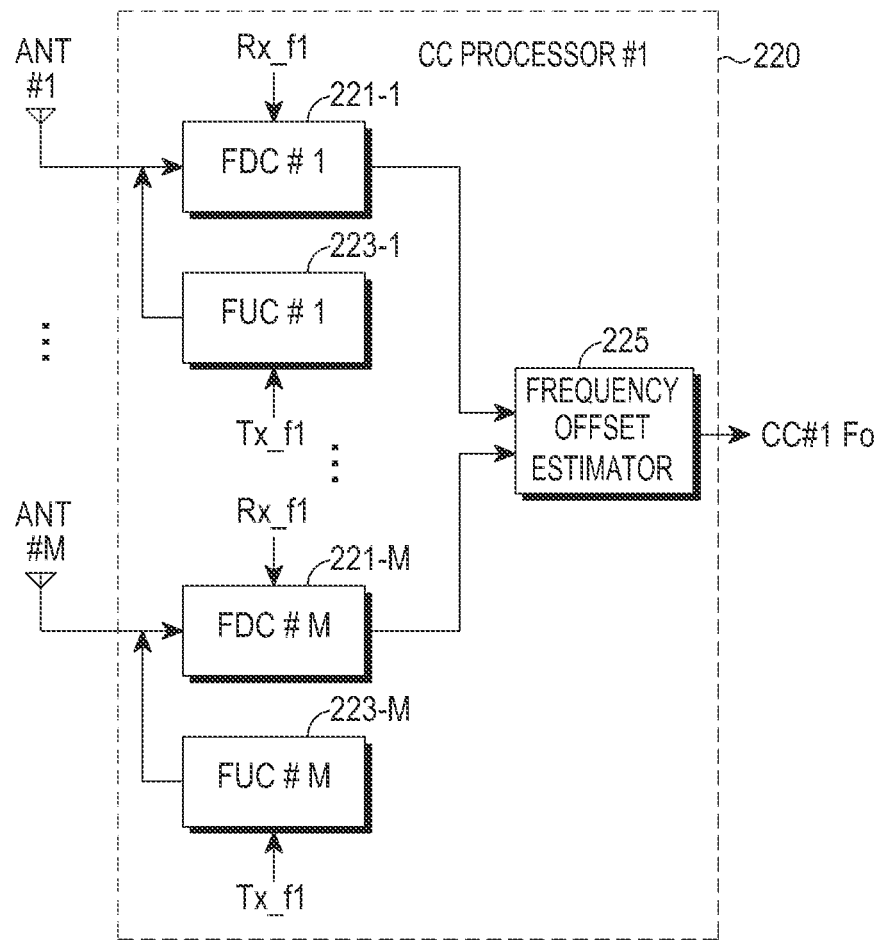
FIG. 2C schematically illustrates an internal structure of a CC processor, such as the CC processor #1 220 in FIG. 2A, according to an embodiment of the present disclosure.
Figure 2D:
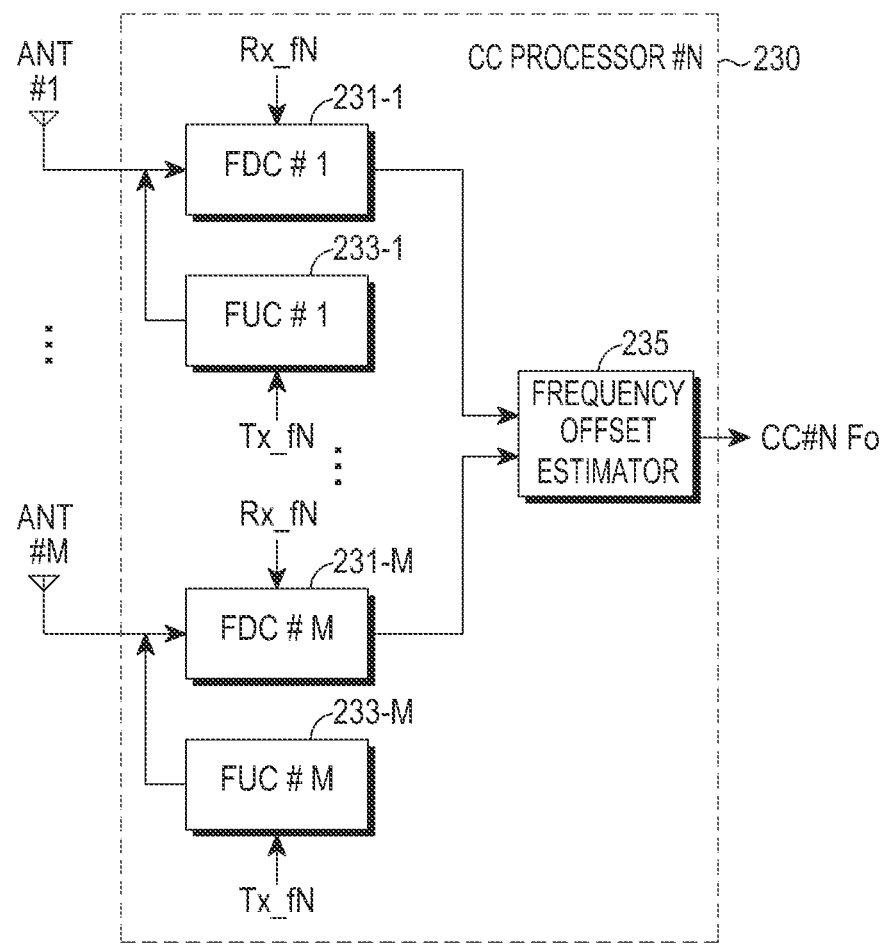
FIG. 2D schematically illustrates an internal structure of a CC processor, such as the CC processor #N 230 in FIG. 2A, according to an embodiment of the present disclosure.

FIG. 2A schematically illustrates an internal structure of a CA processing apparatus in a wireless communication system according to an embodiment of the present disclosure;

FIG. 2B schematically illustrates an internal structure of a CC processor, such as the CC processor #0 210 in FIG. 2A, according to an embodiment of the present disclosure;

FIG. 2C schematically illustrates an internal structure of a CC processor, such as the CC processor #1 220 in FIG. 2A, according to an embodiment of the present disclosure; and FIG. 2D schematically illustrates an internal structure of a CC processor, such as the CC processor #N 230 in FIG. 2A, according to an embodiment of the present disclosure.

Prior to a description of FIGS. 2A to 2D, it will be noted that an internal structure of a CA processing apparatus in FIGS. 2A to 2D is an internal structure of a CA processing apparatus based on PLL control.

Referring to FIG. 2A, the CA processing apparatus includes a plurality of reception antennas, e.g., M reception antennas, i.e., a reception antenna ANT #1 to a reception antenna ANT #M, a plurality of CC processors, e.g., N+1 CC processors, i.e., a CC processor #0 210, a CC processor #1 220, . . . , a CC processor #N 230, a controller 240, a reference clock generator 250, a plurality of reception PLL units, e.g., N+1 reception PLL units, i.e., a reception PLL unit #0 260-0, a reception PLL unit #1 260-1, . . . , a reception PLL unit #N 260-N, and a plurality of transmission PLL units, e.g., N+1 transmission PLL units, i.e., a transmission PLL unit #0 270-0, a transmission PLL unit #1 270-1, . . . , a transmission PLL unit #N 270-N.

Referring to FIG. 2B, the CC processor #0 210 includes M FDCs, i.e., an FDC #1 211-1, . . . , an FDC #M 211-M which are coupled to M reception antennas, i.e., a reception antenna ANT#1 to a reception antenna ANT#M, respectively, M FUCs, i.e., an FUC #1 213-1, . . . , an FUC #M 213-M which are coupled to the reception antenna ANT#1 to the reception antenna ANT#M, respectively, and a frequency offset estimator 215 which is connected to each of the M FDCs.

Referring to FIG. 2C, the CC processor #1 220 includes M FDCs, i.e., an FDC #1 221-1, . . . , an FDC#M 221-M which are coupled to the reception antenna ANT#1 to the reception antenna ANT#M, respectively, M FUCs, i.e., an FUC #1 223-1, . . . , an FUC #M 223-M which are coupled to the reception antenna ANT#1 to the reception antenna ANT#M, respectively, and a frequency offset estimator 225 which is connected to each of the M FDCs.

Referring to FIG. 2D, the CC processor #N 230, as the last CC processor, includes M FDCs, i.e., an FDC #1 231-1, . . . , an FDC #M 231-M which are coupled to the reception antenna ANT#1 to the reception antenna ANT#M, respectively, M FUCs, i.e., an FUC #1 233-1, . . . , an FUC #M 233-M which are coupled to the reception antenna ANT#1 to the reception antenna ANT#M, respectively, and a frequency offset estimator 235 which is connected to each of the M FDCs.

As illustrated in FIGS. 2A to 2D, the CA processing apparatus includes one reference clock generator, i.e., the reference clock generator 250, and the reference clock generator 250 generates a reference clock. For example, the reference clock generator 250 may be implemented as a TCXO or a DCXO. In FIGS. 2A to 2D, while the reference clock generator 250 is implemented as a TCXO or a DCXO, the reference clock generator 250 may be implemented with various forms.

Each of the reception PLL units, i.e., the reception PLL unit #0 260-0, the reception PLL unit #1 260-1, . . . , the reception PLL unit #N 260-N, is connected to the reference clock generator 250, and generates a reception carrier frequency for each CC using the reference clock which is generated in the reference clock generator 250. The reception PLL unit #0 260-0 generates a reception carrier frequency for a CC #0, and the reception PLL unit #1 260-1 generates a reception carrier frequency for a CC #1. In this way, the reception PLL unit #N 260-N, as the last reception PLL unit, generates a reception carrier frequency for a CC #N.

Each of the transmission PLL units, i.e., the transmission PLL unit #0 270-0, the transmission PLL unit #1 270-1, . . . , the transmission PLL unit #N 270-N, is connected to the reference clock generator 250, and generates a transmission carrier frequency for each CC using the reference clock which is generated in the reference clock generator 250. The transmission PLL unit #0 270-0 generates a transmission carrier frequency for the CC #0, and the transmission PLL unit #1 270-1 generates a transmission carrier frequency for the CC #1. In this way, the transmission PLL unit #N 270-N, as the last transmission PLL unit, generates a transmission carrier frequency for the CC #N.

The CA processing apparatus includes one reference clock generator 250, and includes PLL units which may generate a TCF and an RCF for each CC based on the one reference clock generator for each transmission path and each reception path.

If it is assumed that an RRCFS for a CC#n (n=0, 1, 2, . . . , N) is "Rx_fn" and an RTCFS for the CC#n is "Tx_fn", the Rx_fn is provided to an FDC for receiving a carrier frequency signal for each CC#n and the Tx_fn is provided to an FUC for transmitting the carrier frequency signal.

For example, an RRCFS for the CC #0 is "Rx_f0", an RTCFS for the CC #0 is "Tx_f0", the Rx_f0 is provided to the FDC #1 211-1 to the FDC #M 211-M for receiving a carrier frequency signal of the CC #0, and the Tx_f0 is provided to the FUC #1 213-1 to the FUC #M 213-M for transmitting the carrier frequency signal of the CC #0. Further, an RRCFS for the CC #1 is "Rx_f1", an RTCFS for the CC #1 is "Tx_f1", the Rx_f1 is provided to the FDC #1 221-1 to the FDC #M 221-M for receiving a carrier frequency signal of the CC #1, and the Tx_f1 is provided to the FUC #1 223-1 to the FUC #M 223-M for transmitting the carrier frequency signal of the CC #1. In this way, an RRCFS for the CC #N, as the last CC, is "Rx_fN", an RTCFS for the CC #N is "Tx_fN", the Rx_fN is provided to the FDC #1 231-1 to the FDC #M 231-M for receiving a carrier frequency signal of the CC #N, and the Tx_fN is provided to the FUC #1 233-1 to the FUC #M 233-M for transmitting the carrier frequency signal of the CC #N.

A frequency offset estimator included in each CC processor is connected to M RFOCs included in a related CC processor, and estimates a frequency offset CC#n_Fo as a difference between an RRCFS, which is provided to each CC processor through the N+1 reception PLL units included in the CA processing apparatus, i.e., the reception PLL unit #0 260-0, the reception PLL unit #1 260-1, . . . , the reception PLL unit #N 260-Nn and a received carrier frequency signal.

The frequency offset estimator 215 included in the CC processor #0 210 is connected to the FDC #1 211-1, . . . , the FDC #M 211-M, and estimates a CC#0_Fo as a frequency offset which is a difference between an RRCFS Rx_f0 which is provided through the reception PLL unit #0 260-0, the reception PLL unit #1 260-1, . . . , the reception PLL unit #N 260-N, and the received carrier frequency signal.

The frequency offset estimator 225 included in the CC processor #1 220 is connected to the FDC #1 221-1, . . . , the FDC #M 221-M, and estimates a CC#1_Fo as a frequency offset which is a difference between an RRCFS Rx_f1 which is provided through the reception PLL unit #0 260-0, the reception PLL unit #1 260-1, . . . , the reception PLL unit #N 260-N, and the received carrier frequency signal.

In this way, the frequency offset estimator 235, as the last frequency offset estimator included in the CC processor #N 230, is connected to the FDC #1 231-1, . . . , the FDC #M 231-M, and estimates a CC#N_Fo as a frequency offset which is a difference between an RRCFS Rx_fN which is provided through the reception PLL unit #0 260-0, the reception PLL unit #1 260-1, . . . , the reception PLL unit #N 260-N, and the received carrier frequency signal.

The CA processing apparatus in FIGS. 2A to 2D compensates a frequency offset estimated in each CC by controlling a reception PLL unit and a transmission PLL unit for a related CC, a description of which will be provided followed.

Firstly, a scheme in which the CA processing apparatus compensates the frequency offset estimated in each CC by controlling the reception PLL unit for the related CC will be described.

The frequency offset CC#0_Fo for the CC#0 is inputted to the reception PLL unit #0 260-0, thereby the reception PLL unit #0 260-0 compensates the estimated frequency offset CC#0_Fo.

The frequency offset CC#1_Fo for the CC#1 is inputted to the reception PLL unit #1 260-1, thereby the reception PLL unit #1 260-1 compensates the estimated frequency offset CC#1_Fo.

The frequency offset CC#N_Fo for the CC#N is inputted to the reception PLL unit #N 260-N, thereby the reception PLL unit #N 260-N compensates the estimated frequency offset CC#N_Fo.

Secondly, a scheme in which the CA processing apparatus compensates the frequency offset estimated in each CC by controlling the transmission PLL unit for the related CC will be described.

The frequency offset CC#0_Fo for the CC#0 is inputted to the transmission PLL unit #0 270-0, thereby the transmission PLL unit #0 270-0 compensates the estimated frequency offset CC#0_Fo.

The frequency offset CC#1_Fo for the CC#1 is inputted to the transmission PLL unit #1 270-1, thereby the transmission PLL unit #1 270-1 compensates the estimated frequency offset CC#1_Fo.

The frequency offset CC#N_Fo for the CC#N is inputted to the transmission PLL unit #N 270-N, thereby the transmission PLL unit #N 270-N compensates the estimated frequency offset CC#N_Fo.

An operation of a CA processing apparatus according to an embodiment of the present disclosure will be described with reference to FIGS. 2A to 2D.

A reference clock for the CA processing apparatus compensates a frequency offset based on a frequency offset which is estimated in a frequency offset estimator included in a related CC processor corresponding to a CC which is selected from among N+1 CCs, i.e., the CC#0 to the CC#N, i.e., a reference frequency offset.

The CA processing apparatus may perform a reference clock control operation based on a CC which has the best channel quality among the N+1 CCs, i.e., the CC#0 to the CC#N. Here, the channel quality may be determined using various metrics such as a CINR, an RSRP, an RSRQ, an RSSI, a CQI, and a BLER for a control channel or a data channel for each CC. In FIGS. 2A to 2D, the various metrics such as the CINR, the RSRP, the RSRQ, the RSSI, the CQI, and the BLER are used for selecting a CC used for the reference clock control operation. However, it will be understood by those of ordinary skill in the art that metrics used for selecting the CC used for the reference clock control operation are not limited.

The CA processing apparatus may perform a reference clock control operation based on a CC having the best channel quality among N+1 CCs, i.e., the CC#0 to the CC#N. For example, a period of selecting a CC used for the reference clock control operation may be a measurement period by which various metrics such as the CINR, the RSRP, the RSRQ, the RSSI, the CQI, and the BLER are measured. If the various metrics such as the CINR, the RSRP, the RSRQ, the RSSI, the CQI, and the BLER are filtered, the period of selecting the CC used for the reference clock control operation may be set to a multiple of the measurement period.

Meanwhile, a frequency offset which is estimated in a frequency offset estimator included in CC processors corresponding to remaining CCs which are not used for controlling the reference clock is used for controlling a related transmission/reception PLL unit and compensating a frequency offset.

The frequency offset which is estimated in the frequency offset estimator included in the CC processors corresponding to the remaining CCs which are not used for controlling the reference clock is used for compensating the frequency offset through TFOCs and RFOCs included in a related CC processor.

In FIGS. 2A to 2D, a CA processing apparatus compensates a frequency by compensating a frequency offset for a transmission PLL unit and a reception PLL unit in each CC without using a separated frequency offset compensator, so there is a need for providing a control signal from a MOdulator/DE-Modulator (MODEM) to a Radio Frequency Integrated Circuit (RFIC) by a frequency offset compensation period.

A CC processing circuit and/or a CC processing apparatus according to embodiments of the present disclosure as described in FIGS. 1A to 2D processes a CA with reference to a case in which the number of processors for receiving a signal is equal to the number of processors for transmitting a signal. However, it will be understood by those of ordinary skill in the art that the number of processors for receiving the signal may be equal to or different from the number of processors for transmitting the signal.

Further, it will be understood by those of ordinary skill in the art that the number of antennas and the number of CCs in a CC processing circuit and/or a CC processing apparatus according to embodiments of the present disclosure as described in FIGS. 1A to 2D are not limited.

As is apparent from the foregoing description, an embodiment of the present disclosure enables processing CA using a reference CC.

An embodiment of the present disclosure enables processing CA using one reference clock.

An embodiment of the present disclosure enables processing CA by considering a deployment scenario for various CCs.

An embodiment of the present disclosure enables processing CA without using a reference clock for each CC thereby minimizing a cost and a size.

An embodiment of the present disclosure enables compensation of a frequency offset per CC thereby providing various deployment scenarios and flexibly processing CA. So, in an apparatus which uses a relatively low-priced reference clock such as a Home evolved Node B (HeNB) and a repeater, flexible and stable CA implement is possible.

An embodiment of the present disclosure enables controlling generation of a reference clock based on a CC which has the best channel quality among CCs thereby stably controlling a clock.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A circuit for processing Carrier Aggregation (CA), the circuit comprising:
   a plurality of Component Carrier (CC) processors, each CC processor configured to estimate a frequency offset for a related CC and to compensate the estimated frequency offset;
   a reference clock generator configured to generate a reference clock using a reference frequency offset as one of frequency offsets output from the plurality of CC processors;
   a plurality of reception Phase Lock Loop (PLL) units, each reception PLL unit configured to generate a reception carrier frequency for the related CC corresponding to the reference clock; and
   a plurality of transmission PLL units, each transmission PLL unit configured to generate a transmission carrier frequency for the related CC corresponding to the reference clock.

2. The circuit of claim 1, further comprising:
   a controller configured to select the reference frequency offset from the frequency offsets output from the plurality of CC processors and to control the reference clock generator to generate the reference clock using the reference frequency offset.

3. The circuit of claim 1, further comprising:
   a controller configured to select the reference frequency offset from the frequency offsets output from the plurality of CC processors and to control a related CC processor not to compensate the frequency offset for the CC that the reference frequency offset is selected.

4. The circuit of claim 1, wherein each of the plurality of CC processors comprises:
   a plurality of frequency down converters, each frequency down converter frequency down configured to convert an input signal;
   a plurality of frequency up converters, each frequency up converter configured to frequency up convert the input signal;
   a frequency offset estimator configured to estimate a frequency offset which is a difference between a reference reception carrier frequency signal which is provided through the plurality of the reception PLL units and a reception carrier frequency signal;
   a Reception Frequency Offset Compensator (RFOC) configured to compensate a reception frequency offset using the frequency offset; and
   a Transmission Frequency Offset Compensator (TFOC) configured to compensate a transmission frequency offset using the frequency offset.

5. The circuit of claim 4, wherein each of the RFOC and the TFOC includes a module configured to perform a frequency converting operation for the input signal.

6. The circuit of claim 4, wherein each of the RFOC and the TFOC includes one of a phase rotator, a Read Only Table (ROM) table, and a complex multiplier based-phase converter.

7. The circuit of claim 6, wherein the phase rotator includes a COordinate Rotation DIgital Computer (CORDIC).

8. The circuit of claim 1, wherein the reference frequency offset is a frequency offset corresponding to a CC which has a best channel quality among the frequency offsets output from the plurality of CC processors.

9. The circuit of claim 8, wherein the CC which has the best channel quality among the frequency offsets output from the plurality of CC processors is determined by considering at least one of a Carrier-to-Interference and Noise Ratio (CINR), Reference Signal Received Power (RSRP), Reference Signal Received Quality (RSRQ), a Reference Signal Strength Indicator (RSSI), a Channel Quality Indicator (CQI), and a BLock Error Rate (BLER).

10. An apparatus for processing Carrier Aggregation (CA), the apparatus comprising:
    a plurality of Component Carrier (CC) processors, each CC processor configured to estimate a frequency offset for a related CC and to compensate the estimated frequency offset;
    a reference clock generator configured to generate a reference clock using a reference frequency offset as one of frequency offsets output from the plurality of CC processors;
    a plurality of reception Phase Lock Loop (PLL) units, each reception PLL unit configured to generate a reception carrier frequency for the related CC corresponding to the reference clock; and
    a plurality of transmission PLL units, each transmission PLL unit configured to generate a transmission carrier frequency for the related CC corresponding to the reference clock.

11. The apparatus of claim 10, further comprising:
    a controller configured to select the reference frequency offset from the frequency offsets output from the plurality of CC processors and to control the reference clock generator to generate the reference clock using the reference frequency offset.

12. The apparatus of claim 10, further comprising:
    a controller configured to select the reference frequency offset from the frequency offsets output from the plurality of CC processors and to control a related CC processor not to compensate the frequency offset for the CC that the reference frequency offset is selected.

13. The apparatus of claim 10, wherein each of the plurality of CC processors comprises:
    a plurality of frequency down converters, each frequency down converter configured to frequency down convert an input signal;
    a plurality of frequency up converters, each frequency up converter configured to frequency up convert the input signal;
    a frequency offset estimator configured to estimate a frequency offset which is a difference between a reference reception carrier frequency signal which is provided through the plurality of the reception PLL units and a reception carrier frequency signal;
    a Reception Frequency Offset Compensator (RFOC) configured to compensate a reception frequency offset using the frequency offset; and
    a Transmission Frequency Offset Compensator (TFOC) configured to compensate a transmission frequency offset using the frequency offset.

14. The apparatus of claim 13, wherein each of the RFOC and the TFOC includes a module configured to perform a frequency converting operation for the input signal.

15. The apparatus of claim 13, wherein each of the RFOC and the TFOC includes one of a phase rotator, a Read Only Table (ROM) table, and a complex multiplier based-phase converter.

16. The apparatus of claim 15, wherein the phase rotator includes a COordinate Rotation DIgital Computer (CORDIC).

17. The apparatus of claim 10, wherein the reference frequency offset is a frequency offset corresponding to a CC which has a best channel quality among the frequency offsets output from the plurality of CC processors.

18. The apparatus of claim 17, wherein the CC which has the best channel quality among the frequency offsets output from the plurality of CC processors is determined by considering at least one of a Carrier-to-Interference and Noise Ratio (CINR), Reference Signal Received Power (RSRP), Reference Signal Received Quality (RSRQ), a Reference Signal Strength Indicator (RSSI), a Channel Quality Indicator (CQI), and a BLock Error Rate (BLER).

19. A circuit for processing Carrier Aggregation (CA), the circuit comprising:
   a plurality of Component Carrier (CC) processors, each CC processor configured to estimate a frequency offset for a related CC;
   a reference clock generator configured to generate a reference clock using a reference frequency offset as one of frequency offsets output from the plurality of CC processors;
   a plurality of reception Phase Lock Loop (PLL) units, each reception PLL unit configured to generate a reception carrier frequency for the related CC corresponding to the reference clock and to compensate the estimated frequency offset; and
   a plurality of transmission PLL units, each transmission PLL unit configured to generate a transmission carrier frequency for the related CC corresponding to the reference clock and to compensate the estimated frequency offset.

20. The circuit of claim 19, further comprising:
   a controller configured to select the reference frequency offset from the frequency offsets output from the plurality of CC processors and to control the reference clock generator to generate the reference clock using the reference frequency offset.

21. The circuit of claim 19, further comprising:
   a controller configured to select the reference frequency offset from the frequency offsets output from the plurality of CC processors and to control a transmission PLL unit and a reception PLL unit connected to a related CC processor not to compensate the frequency offset for the CC that the reference frequency offset is selected.

22. The circuit of claim 19, wherein each of the plurality of CC processors comprises:
   a plurality of frequency down converters, each frequency down converter configured to frequency down convert an input signal;
   a plurality of frequency up converters, each frequency up converter configured to frequency up convert the input signal; and
   a frequency offset estimator configured to estimate a frequency offset which is a difference between a reference reception carrier frequency signal which is provided through the plurality of the reception PLL units and a reception carrier frequency signal.

23. The circuit of claim 19, wherein the reference frequency offset is a frequency offset corresponding to a CC which has a best channel quality among the frequency offsets output from the plurality of CC processors.

24. The circuit of claim 23, wherein the CC which has the best channel quality among the frequency offsets output from the plurality of CC processors is determined by considering at least one of a Carrier-to-Interference and Noise Ratio (CINR), Reference Signal Received Power (RSRP), Reference Signal Received Quality (RSRQ), a Reference Signal Strength Indicator (RSSI), a Channel Quality Indicator (CQI), and a BLock Error Rate (BLER).

25. An apparatus for processing Carrier Aggregation (CA), the apparatus comprising:
   a plurality of Component Carrier (CC) processors, each CC processor configured to estimate a frequency offset for a related CC;
   a reference clock generator configured to generate a reference clock using a reference frequency offset as one of frequency offsets output from the plurality of CC processors;
   a plurality of reception Phase Lock Loop (PLL) units, each reception PLL unit configured to generate a reception carrier frequency for the related CC corresponding to the reference clock and to compensate the estimated frequency offset; and
   a plurality of transmission PLL units, each transmission PLL unit configured to generate a transmission carrier frequency for the related CC corresponding to the reference clock and to compensate the estimated frequency offset.

26. The apparatus of claim 25, further comprising:
   a controller configured to select the reference frequency offset from the frequency offsets output from the plurality of CC processors and to control the reference clock generator to generate the reference clock using the reference frequency offset.

27. The apparatus of claim 25, further comprising:
   a controller configured to select the reference frequency offset from the frequency offsets output from the plurality of CC processors and to control a transmission PLL unit and a reception PLL unit connected to a related CC processor not to compensate the frequency offset for the CC that the reference frequency offset is selected.

28. The apparatus of claim 25, wherein each of the plurality of CC processors comprises:
   a plurality of frequency down converters, each frequency down converter configured to frequency down convert an input signal;
   a plurality of frequency up converters, each frequency up converter configured to frequency up convert the input signal; and
   a frequency offset estimator configured to estimate a frequency offset which is a difference between a reference reception carrier frequency signal which is provided through the plurality of the reception PLL units and a reception carrier frequency signal.

29. The apparatus of claim 25, wherein the reference frequency offset is a frequency offset corresponding to a CC which has a best channel quality among the frequency offsets output from the plurality of CC processors.

30. The apparatus of claim 29, wherein the CC which has the best channel quality among the frequency offsets output from the plurality of CC processors is determined by considering at least one of a Carrier-to-Interference and Noise Ratio (CINR), Reference Signal Received Power (RSRP), Reference Signal Received Quality (RSRQ), a Reference Signal Strength Indicator (RSSI), a Channel Quality Indicator (CQI), and a BLock Error Rate (BLER).

* * * * *